US006146010A

United States Patent [19]

Plancon

[11] Patent Number: 6,146,010

[45] Date of Patent: Nov. 14, 2000

[54] COMBINED CROWN AND PUSHER ELECTRO MECHANISM

[75] Inventor: Michel Georges Plancon, Watertown, Conn.

[73] Assignee: Timex Corporation, Middlebury, Conn.

[21] Appl. No.: 09/264,523

[22] Filed: Mar. 8, 1999

[51] Int. Cl.[7] ...... F16B 17/08

[52] U.S. Cl. ...... 368/190; 368/319; 368/187

[58] Field of Search ...... 368/185, 187, 368/190–195, 319–321

[56] References Cited

U.S. PATENT DOCUMENTS

| | | | |
|---|---|---|---|
| 3,842,081 | 10/1974 | Komaki | 58/23 R |
| 3,848,400 | 11/1974 | Fluck et al. | 368/193 |
| 3,874,162 | 4/1975 | Boxberger et al. | 58/34 |
| 4,031,341 | 6/1977 | Wuthrich et al. | 200/52 R |
| 4,135,359 | 1/1979 | Yajima | 58/85.5 |
| 4,209,976 | 7/1980 | Flumm | 368/187 |
| 4,283,784 | 8/1981 | Horan | 368/87 |
| 4,295,215 | 10/1981 | Kitai et al. | 368/196 |
| 4,600,316 | 7/1986 | Besson | 368/187 |
| 4,720,823 | 1/1988 | Terzian | 368/190 |
| 4,773,051 | 9/1988 | Soltermann | 368/187 |
| 4,780,864 | 10/1988 | Houlihan | 368/10 |
| 4,783,773 | 11/1988 | Houlihan et al. | 368/108 |
| 4,794,576 | 12/1988 | Schwartz et al. | 368/185 |
| 5,083,300 | 1/1992 | Schwartz | 368/185 |
| 5,644,553 | 7/1997 | Cuinet | 368/320 |

*Primary Examiner*—Bernard Roskoski
*Attorney, Agent, or Firm*—Carmody & Torrance LLP

[57] ABSTRACT

An improved setting mechanism for an electronic watch having a case and circuitry for performing timepiece functions. The setting mechanism includes a setting stem mounted in an opening through the case of the watch. The setting stem is mounted to permit axial and rotational movement of the stem in relation to the case. The setting mechanism also includes a device for generating a first electrical signal which includes incremental electrical pulses in response to a continuous clockwise rotation of the setting stem. The setting mechanism further includes a device for generating a second electrical signal which includes incremental electrical pulses in response to a continuous counterclockwise rotation of the setting stem. The first and the second electrical signals provide inputs to predetermined setting functions for the electronic watch and permit an incremental update of values during the setting functions at a rate directly related to the rate of rotation of the setting stem.

6 Claims, 13 Drawing Sheets

COMBINED CROWN AND PUSHER ELECTRO MECHANISM

FIELD OF THE INVENTION

This invention relates generally to electronic timepieces such as digital timepieces and combined analog and digital timepieces. More particularly, this invention relates to an improved setting mechanism for digital and combined analog and digital timepieces.

BACKGROUND OF THE INVENTION

In general, an analog timepiece includes a watch case, a movement disposed in the watch case having a stepping motor which drives gear trains to operate time indicating hands, a dial, a device for illuminating the dial, a rotatable stem slidably disposed in the movement, a crown actuator disposed on the stem external to the watch case for manually rotating and sliding the stem, and a setting pinion disposed on the stem and adapted to engage the gear train when the stem is pulled from a normal "run" position to a "set" position. As is well known in the art, the crown actuator, the stem and the setting pinion comprise a crown setting mechanism. When in the "set" position, the crown setting mechanism is manually operated so that the setting pinion on the stem engages teeth of a setting gear which meshes with the gear train. In this way the time indicating hands may be rotated by rotating the crown actuator to set the time. An example of such an arrangement is seen in U.S. Pat. No. 5,083,300 issued Jan. 21, 1992 to Schwartz and assigned to the assignee of the present invention. An arrangement which particularly addresses the case of analog timepieces having three time indicating hands, is seen in commonly assigned, U.S. Pat. No. 4,794,576 issued Dec. 27, 1988 to Schwartz et al.

As is also known in the art, the crown setting mechanism may cooperate with the device for illuminating the dial such that when the stem is pushed from the normal "run" position to a "switching" position, the dial is illuminated. A commonly assigned, U.S. Pat. No. 5,644,553 issued Jul. 1, 1997 to Cuinet describes an example of such a combined crown and pusher. The disclosures of commonly assigned, U.S. Pat. Nos. 5,083,300, 4,794,576, and 5,644,553 are incorporated by reference herein in their entireties.

On the other hand, a digital timepiece includes a display, a lamp for illuminating the display, manually actuatable switches (referred to hereinafter as pushers), and an integrated circuit. As is well known, the digital timepiece may have multiple operating modes such as, for example, a time-of-day (TOD) mode, a chronograph (CHRONO) mode, an alarm setting (ALARM) mode, an elapsed timer (TIMER) mode, and an alternate time zone (T2) mode. Generally, one of a plurality of the pushers is activated to change from one operating mode to another. Another one or more of the plurality of the pushers is activated to change information being displayed during a currently activated operating mode. By example, in the ALARM mode a first pusher is activated to select a numeric position on the display. A second pusher is activated to sequence the numeric position through a predetermined series of numbers (e.g., 0–9) which appear on the display. To select a number within the series to represent a current value of the numeric position on the display, the second pusher is released. The first pusher is activated again to deselect the currently selected numeric position and to select a next numeric position on the display. In this way a particular time-of-day can be specified at which time an audible alarm is activated.

Examples of such multi-mode, multi-functioning electronic timepieces include commonly assigned, U.S. Pat. No. 4,783,773 issued Nov. 8, 1988 to Houlihan et al., U.S. Pat. No. 4,780,864 issued Oct. 25, 1988 to Houlihan and U.S. Pat. No. 4,283,784 issued Aug. 11, 1981 to Horan. The disclosure of commonly assigned, U.S. Pat. Nos. 4,783,773, 4,780,864, and 4,283,784 are incorporated by reference herein in their entireties.

As the number of available operating modes and information to be displayed and set during each operating mode increases, there is likewise an increase in the number of pushers needed to activate the modes and/or set the information displayed therein. While the increasing number of modes increase the complexity of use, the increase in the number of pushers may lessen the aesthetic appeal of the timepiece. For example, the complexity in use may increase due to the need to identify which one of the pushers should be activated to cycle through the various operating modes and/or information displayed in one of the operating modes. The increased complexity can be frustrating to a user of the timepiece. In fact, the inventor of the present invention has realized that the setting functions performed with the crown setting mechanism of the analog timepiece are more intuitive for users than the setting functions performed with the plurality of pushers of conventional digital timepieces.

Commonly assigned, U.S. Pat. No. 3,874,162 issued Apr. 1, 1975 to Boxberger et al. ('162 patent) and U.S. Pat. No. 4,031,341 issued Jun. 21, 1977 to Wuthrich et al. describe dual function pushers and rotating switch assemblies for activating features of digital, electronic watches. For example, the '162 patent describes a stem detent and switch assembly which may provide a four position rotary detent action to advance or reset hour, minute and second counters, to select an operating mode, or to shut down the digital watch. In commonly assigned U.S. Pat. No. 4,209,976 issued Jul. 1, 1980 to Flumm, a setting mechanism having a single gear-toothed wheel mounted on a rotatable and axially moveable stem and circuitry for actuating time correction, is described. The time correction increments or decrements a displayed time based on a direction of rotation of the stem. U.S. Pat. No. 3,841,081 issued Oct. 15, 1974 to Komaki and U.S. Pat. No. 4,135,359 issued Jan. 23, 1979 to Yajima also describe rotatable and axially moveable setting mechanisms.

However, these prior art setting mechanisms are still deficient in that they do not provide for a selective engagement of rotational setting positions within a predetermined number of axial setting positions or provide for an electrical signal having a predefined signature which minimizes the effects of manufacturing tolerances in components used to generate the electrical signal. Therefore, a setting mechanism that overcomes the aforementioned differences and achieves the following advantages is desired and is provided by the present invention.

OBJECTS AND ADVANTAGES OF THE INVENTION

Therefore, it is a first object and advantage of this invention to provide an improved setting mechanism for electronic timepieces and, particularly, for digital and combination analog and digital timepieces that overcomes the foregoing and other problems.

It is another object and advantage of this invention to provide a setting mechanism having a predetermined number of axial setting positions and, selectively, having a predetermined number of rotational setting positions wherein are performed setting functions for an electronic timepiece.

It is a further object and advantage of this invention to provide a setting mechanism for generating a predefined electrical signal signature which minimizes the effects of manufacturing tolerances in components used to generate the electrical signal during setting functions for the electronic timepiece.

Further objects and advantages of this invention will become more apparent from a consideration of the drawings and ensuing description.

SUMMARY OF THE INVENTION

The foregoing and other problems are overcome and the objects and advantages are realized by methods and apparatus in accordance with embodiments of this invention, wherein an improved setting mechanism for an electronic timepiece is disclosed.

Generally speaking, a setting mechanism for an electronic watch having a case and circuitry for performing timepiece functions includes a setting stem mounted in an opening through the case of the watch, is provided. The setting stem is mounted to permit axial and rotational movement of the stem in relation to the case. The setting mechanism may generate a first electrical signal which includes incremental electrical impulses in response to a continuous clockwise rotation of the setting stem. The setting mechanism may also generate a second electrical signal which includes incremental electrical impulses in response to a continuous counterclockwise rotation of the setting stem. In accordance with the present invention, the first and the second electrical signals provide inputs to predetermined setting functions for the electronic watch such as, for example, signals which increment or decrement minute or hour counters during time setting functions. In particular, the first and the second electrical signals permit an incremental update of values during the setting functions at a rate directly related to the rate of rotation of the setting stem.

In a preferred embodiment, the setting mechanism is a combination push, pull and rotate setting mechanism for an electronic watch. The watch has a case and circuitry for performing timepiece functions. The circuitry is located within a cavity of the case. The combination push, pull and rotate setting mechanism includes a setting stem mounted in an opening through the case. The setting stem is mounted to enable axial and rotational movement of the stem in relation to the case. The setting mechanism includes a device which, in cooperation with the axial movement of the setting stem, provides a plurality of axial setting positions. In the preferred embodiment, the setting mechanism preferably includes a click-wheel assembly mounted on the setting stem such that the assembly and the stem rotate coaxially to provide rotational setting positions. The assembly includes a clockwise and a counterclockwise click-wheel. The click-wheels each include a plurality of teeth located about an outer diameter of each click-wheel. The setting mechanism further includes a first holding plate and a second holding plate. The first holding plate has an elongated arm which, when in contactable cooperation with the clockwise click-wheel, provides a first electrical signal. The first electrical signal includes electrical impulses formed when the setting stem is rotated in a clockwise direction. The second holding plate has an elongated arm which, when in contactable cooperation with the counterclockwise click-wheel, provides a second electrical signal. The second electrical signal includes electrical impulses formed when the setting stem is rotated in a counterclockwise direction. In accordance with this preferred embodiment, the first and the second electrical signals provide inputs to predetermined setting functions for the electronic watch and permit an incremental update of values during the setting functions at a rate directly related to the rate of rotation of the setting stem.

BRIEF DESCRIPTION OF THE DRAWINGS

The above set forth and other features of the invention are made more apparent in the ensuing Detailed Description of the Invention when read in conjunction with the attached Drawings, wherein.

Identically labeled elements appearing in different ones of the above described figures refer to the same elements but may not be referenced in the description for all figures.

DETAILED DESCRIPTION OF THE INVENTION

The present invention discloses an improved setting mechanism for electronic timepieces and, in particular, a combination push, pull and rotate setting mechanism for digital and combined analog and digital timepieces. As can be appreciated, digital and combined analog and digital timepieces are well known in the art. For example, these timepieces are described in commonly assigned, U.S. Pat. No. 4,783,773 issued Nov. 8, 1988 to Houlihan et al., U.S. Pat. No. 4,780,864 issued Oct. 25, 1988 to Houlihan and U.S. Pat. No. 4,283,784 issued Aug. 11, 1981 to Horan. The disclosure of commonly assigned, U.S. Pat. Nos. 4,783,773, 4,780,864 and 4,283,784 are incorporated by reference herein in their entireties.

Figure 1:
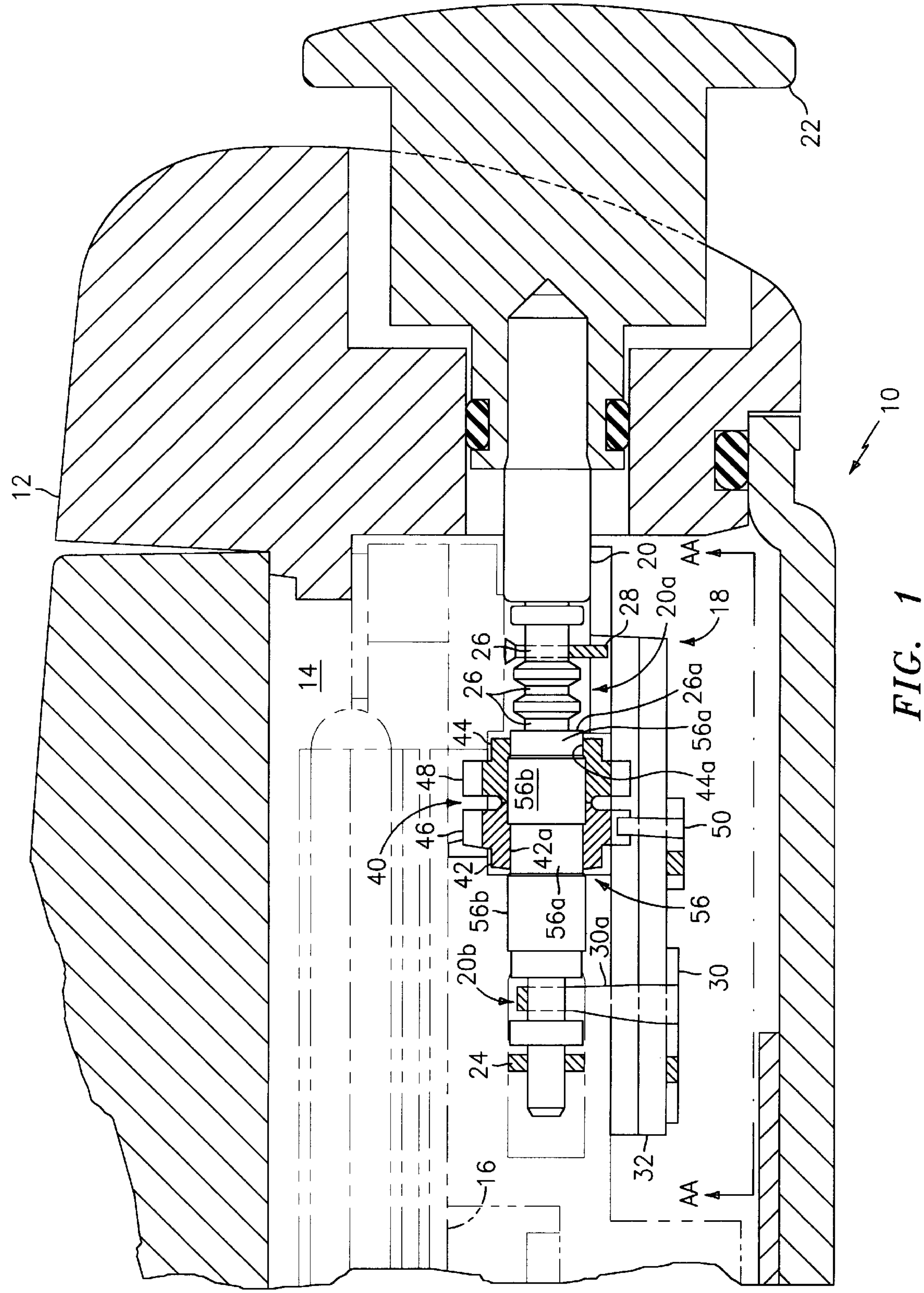
FIG. 1 is an enlarged, elevational view in cross-section of a setting mechanism for an electronic timepiece constructed in accordance with the present invention.

In FIG. 1, an electronic timepiece 10 includes a watch case 12 having a center cavity 14 and watch circuitry (shown generally as circuitry 16) which performs timekeeping related functions of the timepiece 10. The circuitry 16 is disposed within the cavity 14 of the watch case 12. The timekeeping functions of the electronic timepiece 10 are well known in the art, as is described in the above-referenced, commonly assigned U.S. patent applications, and therefore, are not described in further detail herein.

As shown in FIG. 1, the electronic timepiece 10 includes a setting mechanism, generally indicated at 18, for selectively activating various timekeeping related functions of the timepiece 10 and, particularly, for performing setting or resetting functions within a current operating mode of the timepiece 10. The setting mechanism 18 preferably includes a setting stem 20 which extends from the cavity 14 through a bore of the watch case 12. At a first end of the setting stem 20 is fitted a knob or crown such as a crown actuator 22. The crown actuator 22 is manually manipulated to slide the stem 20 axially within a plurality of axial setting positions. At a second end of the setting stem 20, which is located opposite the first end and disposed within the cavity 14, is a spring plate 24. The spring plate 24 engages the second end of the stem 20 and biases the stem 20 to achieve the plurality of axial setting positions.

As is generally known, the axial setting positions may include, for example, a normal "run" position, a "push" or "switch" position, a first pulled or "time setting" position, and a second pulled or "alternate setting" position. In the normal "run" position, the setting features of the timepiece 10 may not be activated, rather, the timepiece 10 is operative to display time-related information and to provide timekeeping functions. In the "push" position, the setting stem 20 cooperates with a switching device (discussed in detail below) to activate a feature of the timepiece such as, for example, a feature to illuminate the display. In the first and the second pulled positions setting or resetting functions of the timepiece 10 may be performed.

In one embodiment of the present invention, the setting stem 20 includes a first portion 20*a* having, for example, a plurality of spaced detent grooves 26. The plurality of spaced detent grooves 26 cooperate with a retaining spring 28 while the setting stem 20 cooperates with the spring plate 24 to retain the setting stem 20 in the first "pulled" and the second "pulled" positions. The retaining spring 28 and a wall 26*a* of one of the plurality of grooves 26 cooperate to substantially prevent the setting stem 20 from being accidentally withdrawn through the watch case 14 as the setting stem 20 is pulled.

Figure 2A:
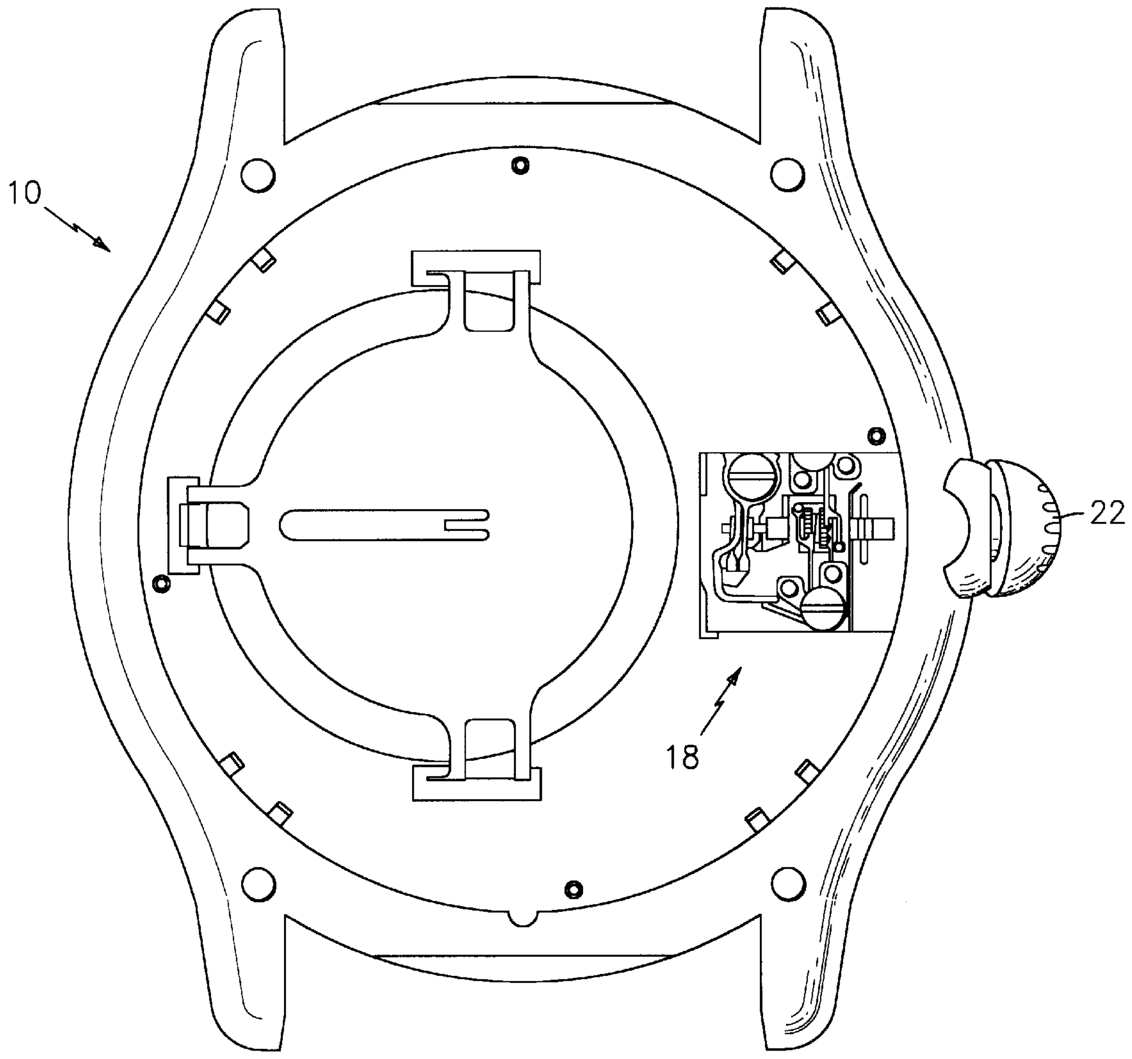
FIG. 2A is a plan view from a back, or movement, side of the electronic timepiece of FIG. 1.
Figure 2B:
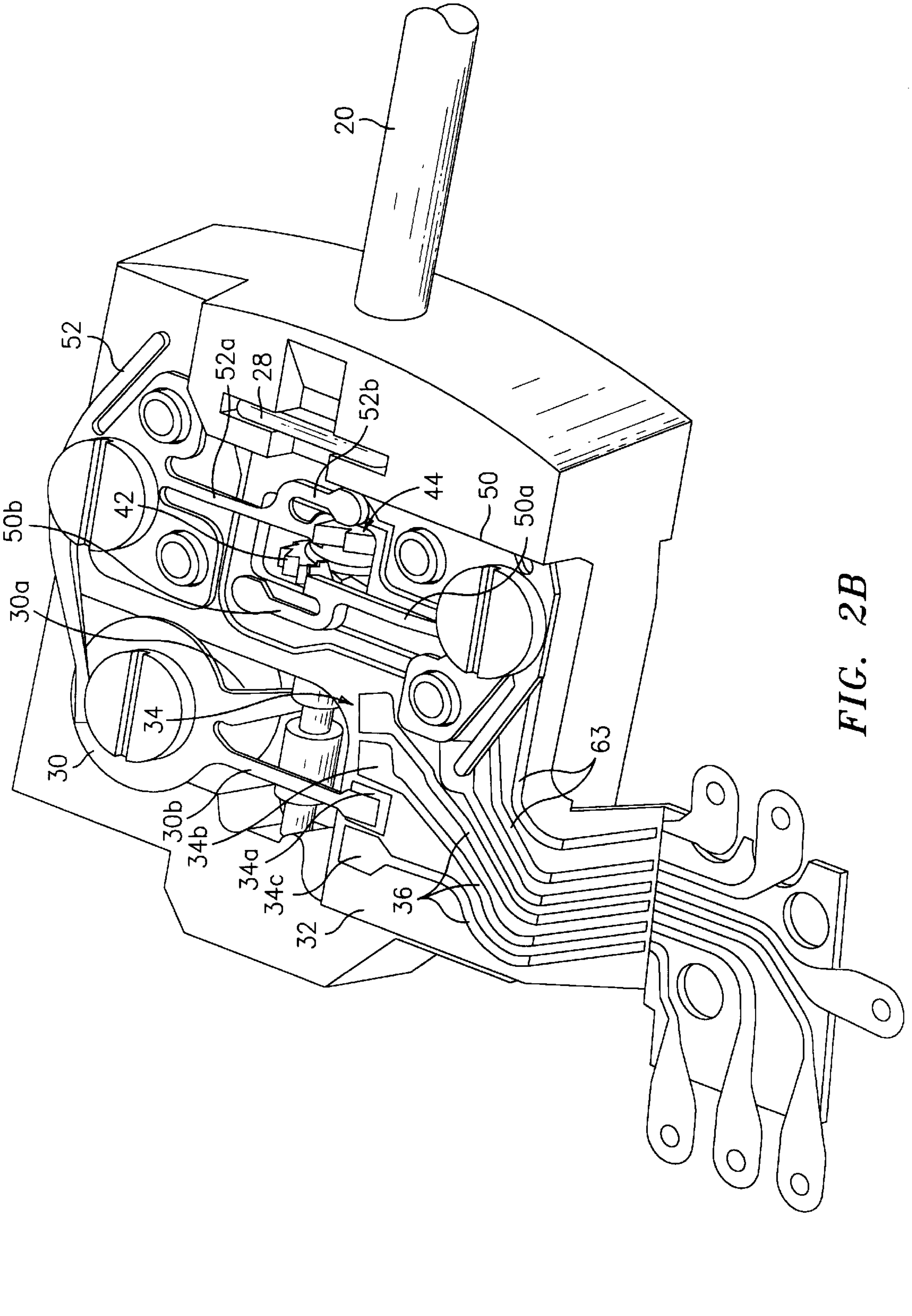
FIG. 2B is an enlarged, perspective view of the movement side of the timepiece of FIG. 2A illustrates the setting mechanism.

In one aspect of the present invention, shown in FIGS. 1 and 2B, a function lever 30 engages the setting stem 20 and in cooperation therewith indicates a currently selected one of the axial setting positions. For example, the setting stem 20 includes a second portion 20*b* having a reduced diameter or slot which retains a finger portion 30*a* of the function lever 30. When the setting stem 20 is axially displaced a predetermined distance, the finger portion 30*a* and, thus, the function lever 30 rotates or slides in response to the displacement. By detecting the displacement of the function lever 30 (as discussed below), the circuitry 16 determines a current axial position of the setting stem 20.

That is, as shown in FIG. 2B, the circuitry 16 includes a printed circuit board (PCB) 32 connected to an integrated circuit chip (not shown). The PCB 32 includes a plurality of contact terminals 34 connected to the integrated circuit chip through printed circuit leads 36. In accordance with the present invention, an indicating arm 30*b* of the lever 30 will contact each respective one of the plurality of contact terminals 34 in a predefined manner when the setting stem 20 is in a predefined one of the axial setting positions described above. For example, contact terminal 34*a* may represent the normal "run" position, contact terminal 34*b* may represent the first "pulled" setting position, and contact terminal 34*c* may represent the "push" setting position. In accordance with this embodiment of the present invention, as the setting stem 20 axially moves, the indicating arm 30*b* electrically contacts the plurality of contact terminals 34. The circuitry 16 therefore functions based on the current position of the setting stem 20 within the plurality of axial setting positions. Therefore, when the setting stem 20 is axially manipulated (e.g., pulled from the normal "run" position to the first "pulled" position), the function lever 30 rotates or slides and the indicating arm 30*b* travels from the normal "run" contact terminal 34*a* to the first "pulled" contact terminal 34*b*. An electrical contact is established at terminal 34*b* to notify, or inform, the integrated circuit chip of the timepiece 10 that the setting stem 20 is now in the first pulled position. As discussed above, when the setting stem 20 is in the "push" position the indicating arm 30*b* electrically contacts the contact terminal 34*c*, and the integrated circuit chip knows that the setting stem 20 is in the "push" position. In response, the integrated circuit chip activates a feature of the timepiece, for example and as discussed above, the device for illuminating the display.

In a second aspect of the present invention, the crown actuator 22 is manually rotationally manipulated to rotate the setting stem 20 in a clockwise and a counterclockwise direction in relation to the watch case 12. In accordance with the present invention, the clockwise and the counterclockwise rotation of the setting stem 20 provides rotational setting positions which supplement corresponding ones of the axial setting positions. Thus, in accordance with the present invention, the direction of rotation as well as a rate of rotation of the setting stem 20 provide additional setting functions for the electronic timepiece 10.

For example, by detecting a rate of clockwise rotation of the setting stem 20 during a setting function, a value displayed by the timepiece 10 is incrementally increased through a series of predefined values. The rate of incremental increase preferably corresponds directly to the rate of clockwise rotation of the setting stem 20 and/or the construction of the preferred click-wheel teeth arrangement as discussed below. That is, the rate at which the setting stem 20 is rotated can dictate the rate at which a current value is replaced by a next value in a series of predefined values. Similarly, by detecting a rate of counterclockwise rotation of the setting stem 20, a value displayed by the timepiece 10 may be incrementally decreased through a series of predefined values at a rate corresponding directly to the rate of counterclockwise rotation of the setting stem 20. The detection techniques and incremental updating of values are discussed in further details below.

As shown in FIGS. 1, 2A and 2B, a click-wheel assembly generally indicated at 40 is disposed within the cavity 14 of the timepiece 10 and is mounted on the setting stem 20. In particular, FIG. 2A illustrates the location of the setting mechanism 18 on a movement side of the watch case 12. FIG. 2B shows an enlarged, perspective view of the setting mechanism 18. As shown in FIGS. 1 and 2B, the click-wheel assembly 40 includes a clockwise click-wheel 42 and a counterclockwise click-wheel 44. The click-wheels 42 and 44 and the setting stem 20 are coaxial in their rotation. Each of the click-wheels 42 and 44 include a plurality of teeth 46 and 48, respectively, located on an outer diameter of each click-wheel. A first and a second holding plate 50 and 52 each have a respective elongated arm 50*a* and 52*a* which cooperates with the click-wheel assembly 40 to generate electrical signals in response to the clockwise and the counterclockwise rotation of the setting stem 20. For example, the elongated arm 50*a* of the first holding plate 50 cooperates with the clockwise click-wheel 42 to provide a first electrical signal in response to the clockwise rotation of the setting stem 20. Similarly, the elongated arm 52*a* of the second holding plate 52 cooperates with the counterclockwise click-wheel 44 to provide a second electrical signal in response to the counterclockwise rotation of the setting stem 20. The first and the second electrical signals are passed to the circuitry 16 of the electronic watch 10 as inputs to a predetermined one of the setting functions.

Figure 8A:
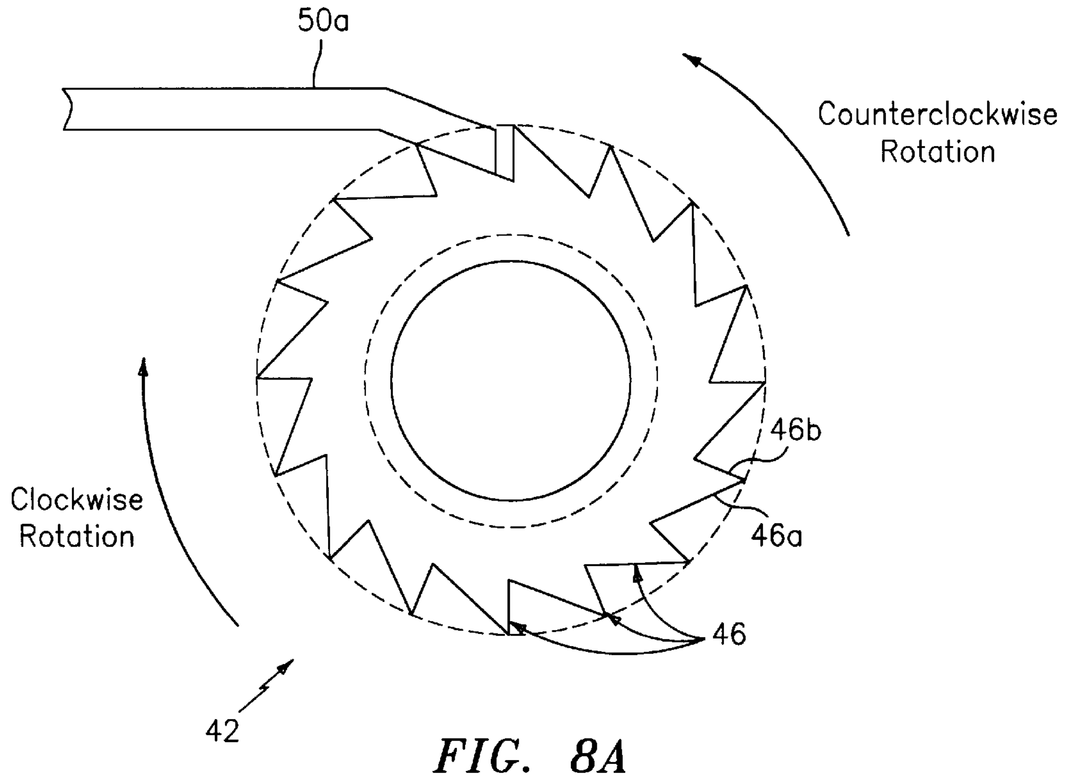
FIGS. 8A and 8B are front, elevational views of a clockwise click-wheel and a counterclockwise click-wheel constructed in accordance with the present invention.
Figure 8B:
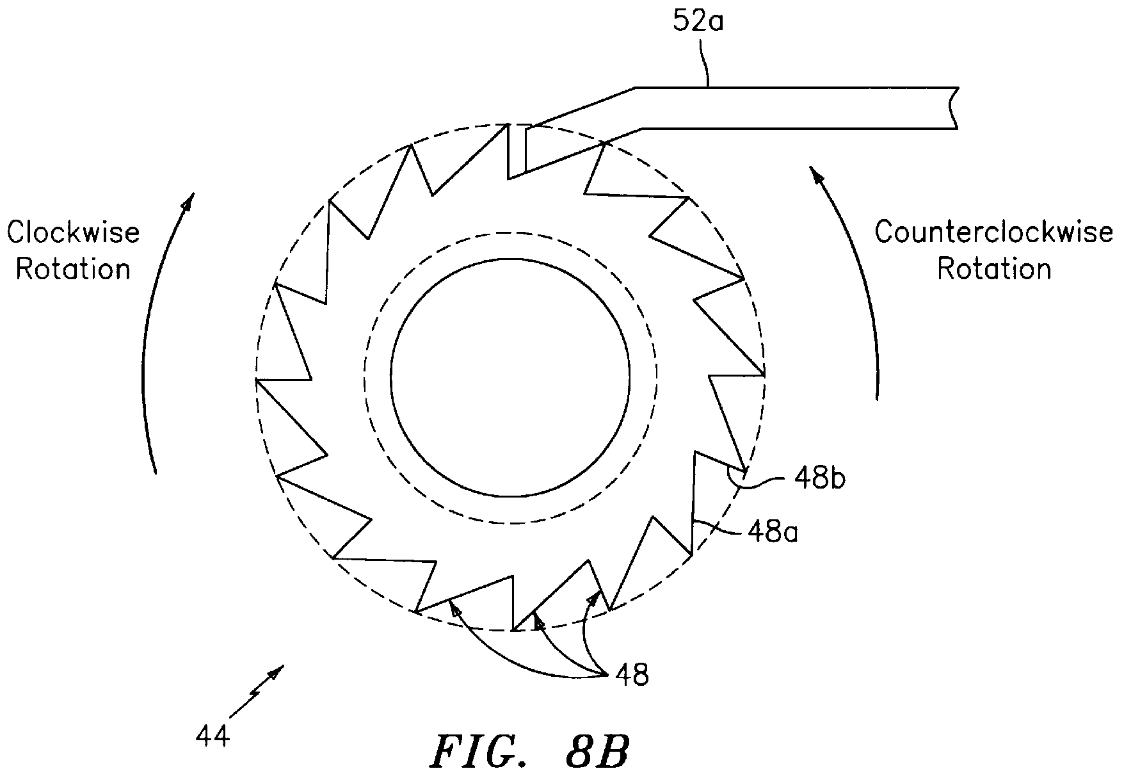

In one embodiment of the invention, shown in FIGS. 8A and 8B, the plurality of teeth 46 and 48 of the respective click-wheels 42 and 44 are of a "saw tooth-like" configuration. That is, a first face 46*a* and 48*a* of each respective tooth on each click-wheel is substantially inclined such that a corresponding one of the respective elongated arms 50*a* and 52*a* passes over the first face 46*a* and 48*a* of each tooth as the click-wheels 42 and 44 are rotated. A second face 46*b* and 48*b* of each respective tooth on each click-wheel is substantially vertical such that when the corresponding elongated arms 50*a* and 52*a* contact the vertical faces the respective arm is seated there against and does not pass over the tooth. As such, the plurality of teeth 46 and 48 of the click-wheels 42 and 44 and the elongated arms 50*a* and 52*a* cooperate to achieve a "ratchet-like" operation such that motion in substantially only one direction is realized by each of the clockwise click-wheel 42 and the counterclockwise click-wheel 44.

Accordingly, when the setting stem 20 is rotated in the clockwise direction the elongated arm 50*a* of the first holding plate 50 passes over the inclined faces 46*a* of the plurality of teeth 46 of the clockwise click-wheel 42 and first electrical signals are incrementally produced. That is, a pulse or disruption in the first signal is produced as the elongated arm 50*a* encounters the inclined faces 46*a* of the plurality of teeth 46. This pulsed signal is discussed in greater detail below. During the clockwise rotation, the counterclockwise click-wheel 44 attempts to rotate about the setting stem 20. The elongated arm 52*a* of the second holding plate 52 likewise attempts to traverse the teeth 48 of the counterclockwise click-wheel 44. However, during the clockwise rotation of the setting stem 20 the elongated arm 52*a* encounters the vertical face 48*b* of the teeth 48 of the counterclockwise click-wheel 44. As a result, the counterclockwise click-wheel 44 is substantially prevented from rotating and the second electrical signals are provided as a steady signal, that is, the second signal does not contain pulses. As can be appreciated, a similar yet reverse action is seen when the setting stem 20 is rotated in the counterclockwise direction, i.e. the elongated arm 50*a* encounters the vertical face 46*b* of the teeth 46 to substantially prevent the clockwise click-wheel 42 from rotating, while the counterclockwise click-wheel 44 rotates and, in cooperation with the elongated arm 52*a*, incrementally produces the second signals. The incremental production of the first and the second electrical signals is discussed in greater detail below.

To achieve the foregoing, the click-wheels 42 and 44 are mounted upon the setting stem 20 with a sufficient frictional engagement such that, when not impeded by the respective contact of the elongated arms 50*a* and 52*a* and the vertical faces 46*b* and 48*b* of the plurality of teeth 46 and 48, the click-wheels 42 and 44 are permitted to rotate with the setting stem 20. However, when the elongated arms 50*a* and 52*a* and the vertical faces 46*b* and 48*b* of the teeth 46 and 48 cooperate to impede the click-wheels from rotating, the frictional contact between the click-wheels 42 and 44 and the setting stem 20 is not enough to prevent the respective click-wheel from slipping about the setting stem 20, and the setting stem 20 is allowed to rotate while the inhibited click-wheel is essentially stationary. Thus, in the configuration described above, when the setting stem 20 is rotated in the clockwise direction, the setting stem 20 and the clockwise click-wheel 42 rotate while the counterclockwise click-wheel 44 is essentially stationary. And, when the setting stem 20 is rotated in the counterclockwise direction, the setting stem 20 and the counterclockwise click-wheel 44 rotate while the clockwise click-wheel 42 remains essentially stationary.

Referring again to FIG. 1, in one embodiment of the present invention, the setting stem 20 has an intermediate section generally indicated at 56, having first portions 56*a* of a first diameter and second portions 56*b* of a second, larger diameter. The first diameter is of a dimension that is insufficient to cause the frictional engagement between the setting stem 20 and respective inner diameters 42*a* and 44*a* of the click-wheels 42 and 44, while the second diameter is of a sufficient dimension to frictionally engage the setting stem 20 and the inner diameters 42*a* and 44*a*. In accordance with this embodiment, the click-wheels 42 and 44 are mounted above the first respective portions 56*a* when the setting stem 20 is in the normal "run" axial setting position. As such, rotating the setting stem 20 while in the normal "run" position does not rotate the click-wheels 42 and 44. The click-wheels 42 and 44 are positionable above and frictionally engage (i.e. the inner diameters 42*a* and 44*a* engage) the respective second portions 56*b* of the setting stem 20 when the setting stem 20 is in the first and the second "pulled" positions and, thus, rotating the setting stem 20 while in these "pulled" positions causes the rotation of the click-wheels 42 and 44 as described above. In this configuration, it will be appreciated that both the first and the second "pulled" positions of the plurality of axial setting positions include a corresponding clockwise and counterclockwise rotational setting position. As was discussed above, the rotational setting positions can direct setting functions to incrementally increase (e.g., in the clockwise position) and incrementally decrease (e.g., in the counterclockwise position) values during the axial setting functions.

As may now be appreciated, alternate configurations of the intermediate portion 56 of the setting stem 20 may be provided such that, for example, the rotational setting positions are, or are not, realized when the setting stem 20 is placed in one of the plurality of axial setting positions. For example, a length of the second portion 56*b* may be reduced and aligned so that the rotational setting positions are not available when the setting stem 20 is in the second pulled position. Alternatively, the second portion 56*b* of the setting stem 20 may be configured such that when the setting stem 20 is located in the "pushed" position, the click-wheels 42 and 44 (i.e. the inner diameters 42*a* and 44*a*) are in frictional contact with the setting stem 20. As a result, the "pushed" axial setting position would include additional clockwise and counterclockwise rotational setting positions. Further, the second portions 56*b* may be configured such that only one of the clockwise or the counterclockwise rotational setting positions is available at one or more of the axial setting positions.

Figure 5:
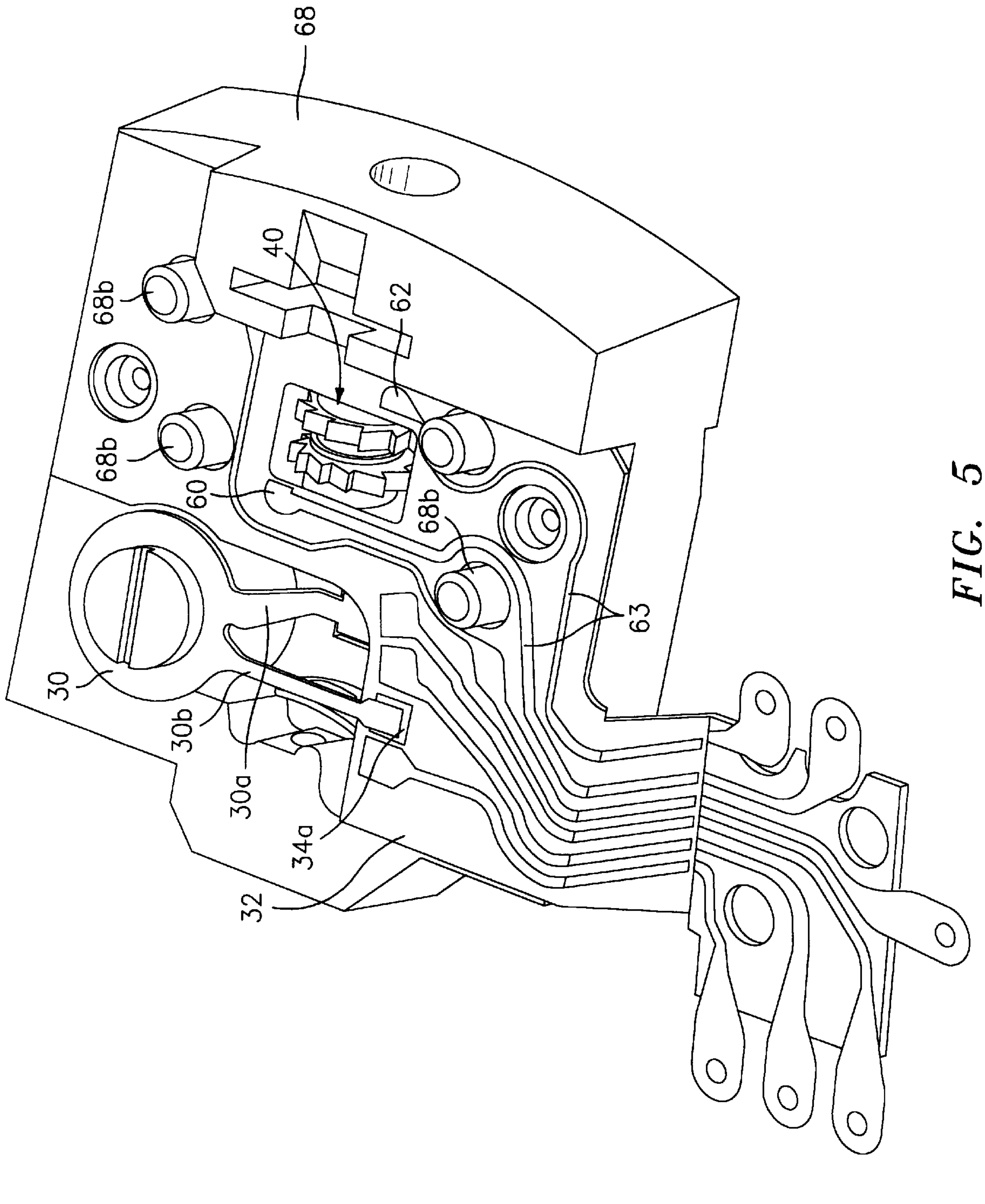
FIG. 5 is a perspective view illustrating a second layer of the setting mechanism with certain components added for ease of illustration.

Referring again to FIG. 2B, the holding plates 50 and 52 further include preferably integrally formed signaling arms 50*b* and 52*b*, respectively. In one embodiment of the present invention, the signaling arms 50*b* and 52*b* extend from a respective one of the elongated arms 50$a$ and 52$a$ of the holding plates 50 and 52. The signaling arms 50$b$ and 52$b$ rest upon contact terminals 60 and 62, respectively (FIG. 5). The contact terminals 60 and 62 may be components of the PCB 32 and are connected to the integrated circuit chip through printed circuit leads 63. In accordance with the present invention, the signaling arms 50$b$ and 52$b$ electrically contact the contact terminals 60 and 62 to form the first and the second electrical signals from the setting mechanism 18 to the integrated circuit chip of the electronic timepiece 10. When the elongated arms 50$a$ and 52$a$ traverse the respective teeth 46 and 48 of the click-wheels 42 and 44, the electrical contacts between the signal arms 50$b$ and 52$b$ and the contact terminals 60 and 62 are respectively disrupted resulting in incremental, or pulsed, first and second electrical signals.

For example, during a clockwise rotation of the setting stem 20 the clockwise click-wheel 42 rotates while the counterclockwise click-wheel 44 is essentially stationary. As the clockwise click-wheel 42 rotates the elongated arm 50$a$ of the first holding plate 50 traverses the first faces 46$a$ of the teeth 46 of the clockwise click-wheel 42 in the above-described "ratchet-like" operation. As the elongated arm 50$a$ traverses the teeth 46, the elongated arm 50$a$ is deflected away from the axis of rotation of the setting stem 20. As a result, the signaling arm 50$b$ is also deflected causing the electrical contact between the signaling arm 50$b$ and the contact terminal 60 to be disrupted. As the elongated arm 50$a$ repeatedly encounters each of the plurality of teeth 46 of the clockwise click-wheel 42, a repeated or incremental series of disruptions in the electrical contact between the signaling arm 50$b$ and the contact terminal 60 yields an incremental, or pulsed, first electrical signal. The frequency or rate of the increments in the first signal is defined by the rate at which the signaling arm 50$b$ is deflected by each of the plurality of teeth 46. It follows, therefore, that the rate at which increments are produced in the first electrical signal can directly correspond to the rate at which the setting stem 20 is rotated in the clockwise direction. As should be appreciated, the rate at which increments are produced in the second electrical signal directly corresponds to the rate at which the setting stem 20 is rotated in the counterclockwise direction since the rate of the increments in the second electrical signal is defined by the rate at which the signaling arm 52$b$ is deflected by each of the plurality of teeth 48.

An additional factor in determining the rate at which increments, or pulses, occur in the first and the second electrical signals is the number of teeth 46 and 48 provided on the outer diameter of the clockwise and counterclockwise click-wheels 42 and 44. Referring again briefly to FIGS. 8A and 8B, the click-wheels 42 and 44 are shown having sixteen teeth 46 and 48 disposed on their respective outer diameters. In accordance with the present invention, the plurality of teeth 46 and 48 may be comprised of a range of teeth from about one tooth per click-wheel to the illustrated sixteen teeth per click-wheel. As should be appreciated, the number of teeth comprising a given range of teeth 46 and 48 effects the rate at which increments may occur within the first and the second electrical signals. Exemplary click-wheel configurations and resulting first and second electrical signal "signatures" are illustrated in FIGS. 9A–9D, and FIGS. 10A–10H.

Figure 10A:
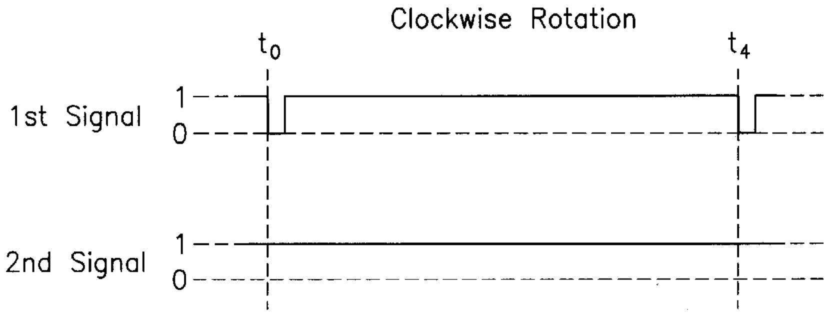
FIGS. 10A–10H illustrate exemplary setting signal signatures in accordance with the present invention.

In a first exemplary embodiment, the plurality of teeth 46 and 48 of the click-wheels 42 and 44 are comprised of one tooth. In this embodiment, a clockwise rotation of the setting stem 20 generates a single increment, or pulse, in the first signal while a constant signal value is maintained in the second signal. Similarly, a counterclockwise rotation of the setting stem 20 generates a constant signal value in the first electrical signal while a single increment is seen in the second electrical signal. As shown in FIG. 10A, a time period represented as beginning at a time $t_0$ and ending at a time $t_4$ corresponds to one complete rotation (e.g., an about 360° rotation) of the setting stem 20. Thus, in the first exemplary embodiment a signal pulse is generated.

As can be appreciated from the description above, the electrical contact between the signaling arms 50$b$ and 52$b$ and the contact terminals 60 and 62 may be represented by an "on" state, or a "1" value in the signal signatures illustrated in FIGS. 10A–10H. The disruptions in the electrical contact resulting from the teeth of the click-wheel striking the elongated arms 50$a$ and 52$a$ are represented by the pulses, or drop-offs from the "on" states ("1" values) to an "off" state ("0" values) in FIGS. 10A–10H. However, this is by way of design choice and the opposite configuration is likewise possible.

Figure 9A:
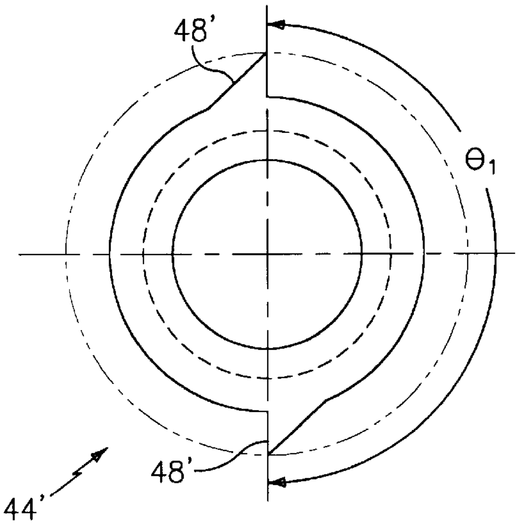
FIGS. 9A–9D are front, elevational views of alternate embodiments of the clockwise and counterclockwise click-wheels of FIGS. 8A and 8B.
Figure 9B:
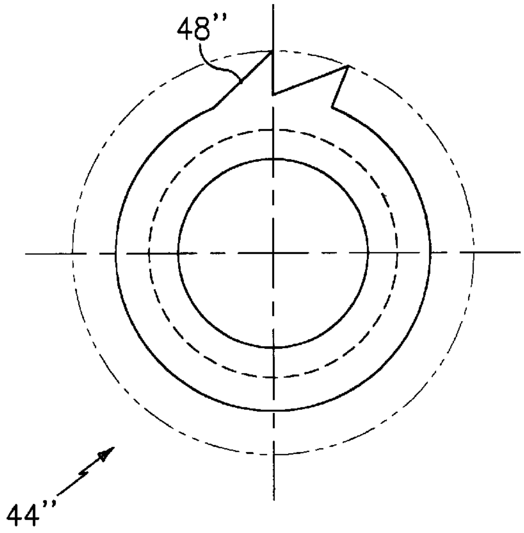
Figure 10C:
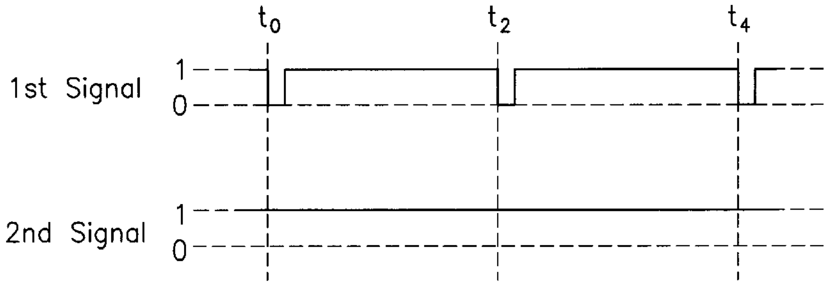
Figure 10E:
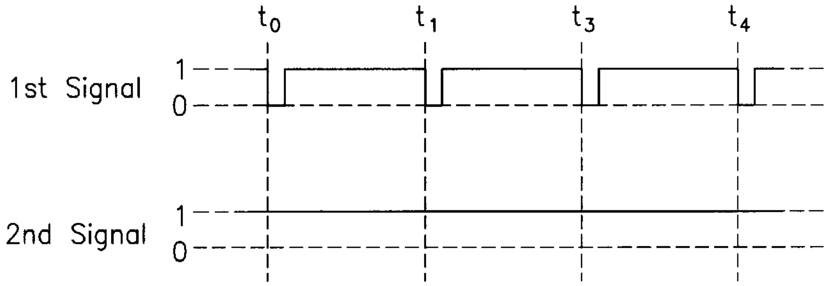

In a second exemplary embodiment shown in FIG. 9A, the plurality of teeth 48 of the counterclockwise click-wheel 44 (represented in this embodiment as teeth 48' and click-wheel 44', respectively) are comprised of two teeth located, for example, in a 12 o'clock and a 6 o'clock position on the outer diameter of the counterclockwise click-wheel 44' (i.e., at an angle, $\theta_1$, of about 180°). Thus, a counterclockwise rotation of the setting stem 20 generates two increments, or pulses, in the second signal in each counterclockwise rotation of the setting stem 20. The resulting second signal signature is shown in FIG. 10D. Importantly, since the two teeth are offset by the about 180° degree angle, the second pulse is generated at a half-turn point in the counterclockwise rotation. This half-turn point is illustrated in FIG. 10D at a time $t_2$. During the counterclockwise rotation, the first electrical signal remains at a constant signal value (i.e. at the "1" or "on" state value). A reverse signal pattern is realized as the setting stem 20 is rotated in the clockwise direction, assuming, of course, the teeth 46 of the clockwise click-wheel 42 are similarly configured. That is, the second signal remains at a constant "on" state signal value while the first electrical signal is generated with two increments or pulses (FIG. 10C).

Figure 9C:
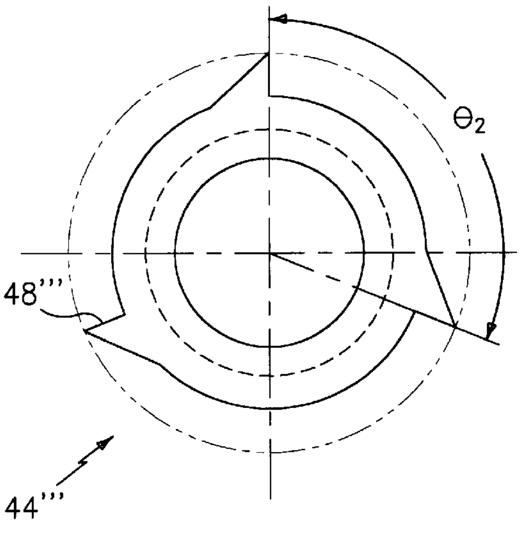
Figure 9D:
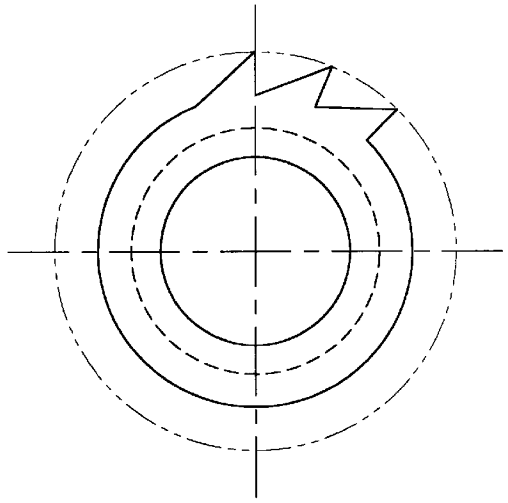

In an alternative configuration, two teeth 48" of the counterclockwise click-wheel 44" are located consecutively about the outside diameter of the click-wheel 44". In the alternate embodiment, the signature of the second electrical signal becomes a signal having consecutive pulses. The signature of the first and the second signals for the second embodiment and the alternate embodiment are shown in FIGS. 11A and 11B, respectively. As can be appreciated by comparing the signatures illustrated in FIGS. 10A–10H and 11A–11D, various first and second signal patterns can be realized by altering the number and relative positions of the teeth 46 and 48 of the click-wheels 42 and 44. For example, in FIGS. 9C and 9D, the plurality of teeth 48 of the counterclockwise click-wheel 44 are comprised of three teeth 48'". In FIG. 9C, the three teeth 48'" are located at an angle, $\theta_2$, of about 120° from each other. In the embodiment illustrated in FIG. 9C, the first and the second signal signatures are shown in FIG. 10F. As shown in FIG. 10F the three pulses occur at points $t_0$, $t_1$ and $t_3$ which, due to the location of the teeth at the about 120° angles, effectively divides the time period representing the full rotation of the stem ($t_0$–$t_4$) into thirds. An alternate embodiment of the click-wheel of FIG. 9C is illustrated in FIG. 9D where the teeth 48'" are located in a consecutive manner on the outer diameter of the counterclockwise click-wheel 44'". A comparison of the signatures for these three teeth embodiments is illustrated in FIGS. 11C and 11D, respectively.

Figure 10G:
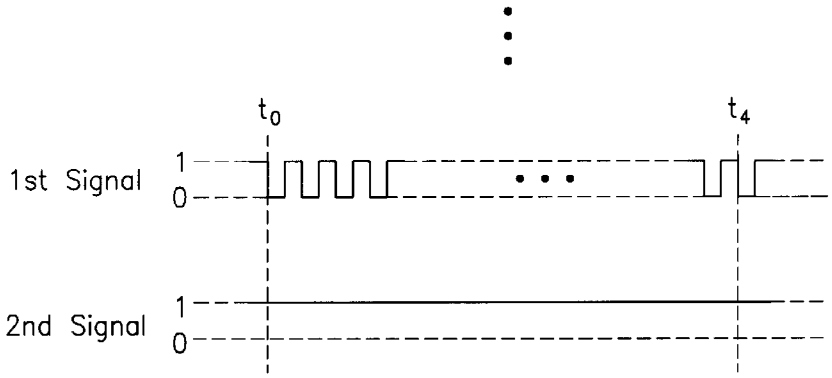
Figure 10B:
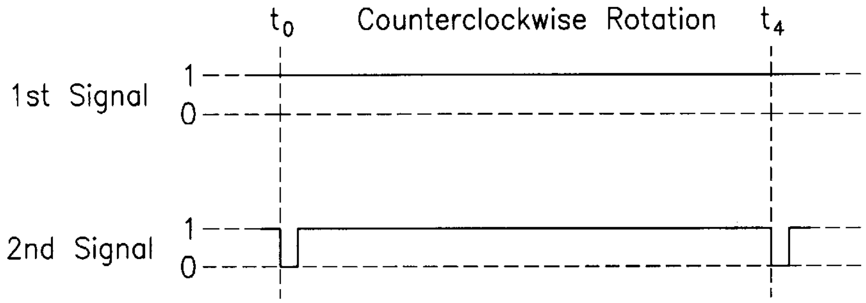
Figure 10D:
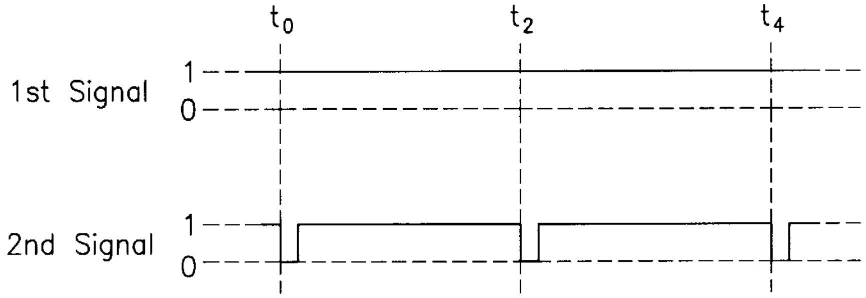
Figure 10F:
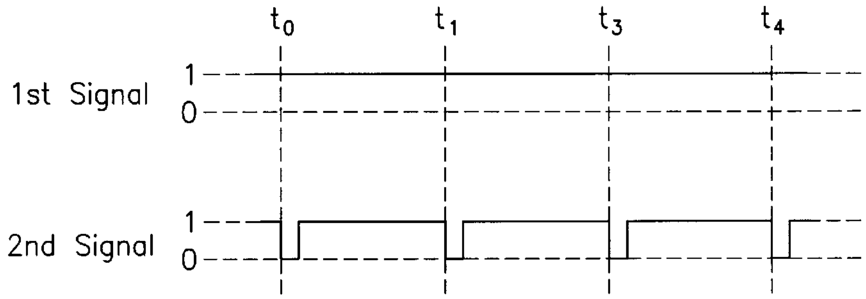
Figure 10H:
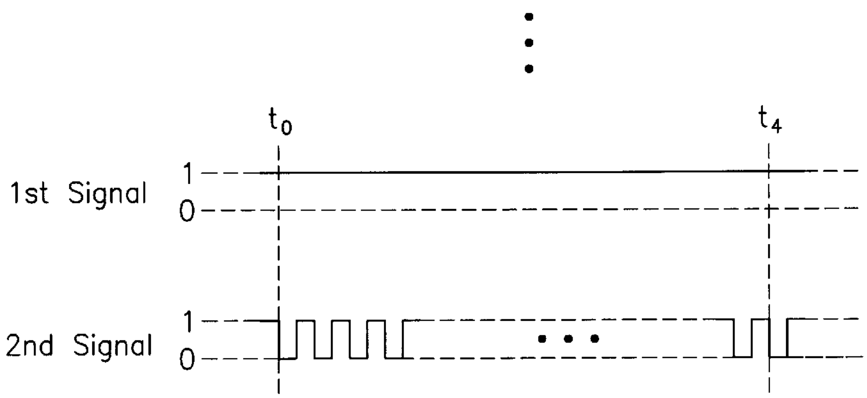
Figure 11A:
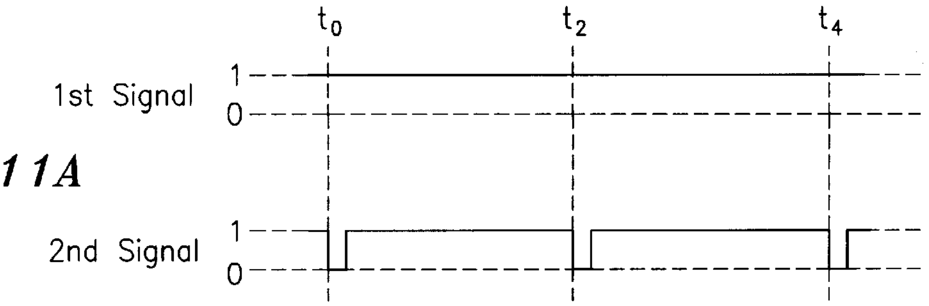
FIGS. 11A–11D compare alternate setting signal signatures in accordance with the present invention.
Figure 11B:
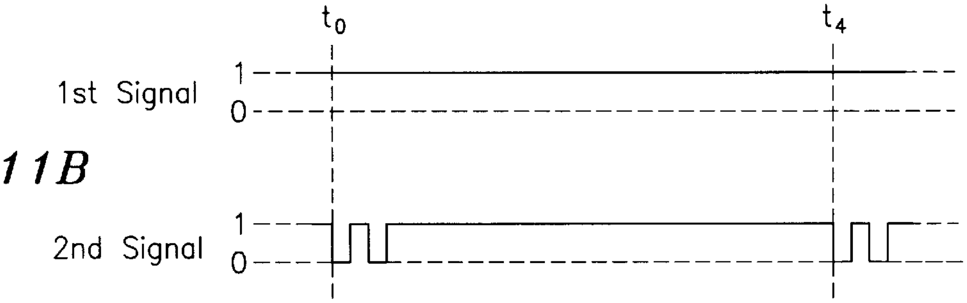
Figure 11C:
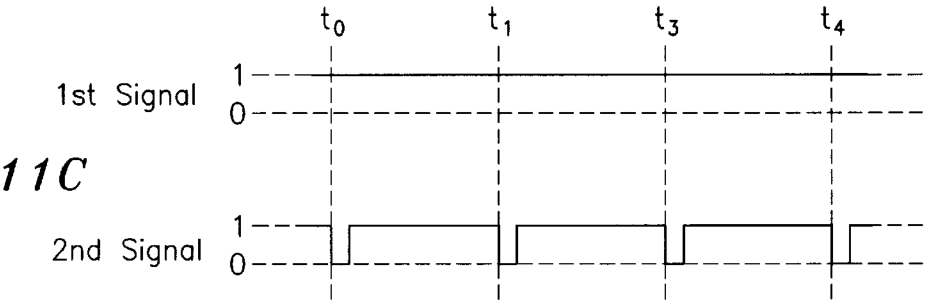
Figure 11D:
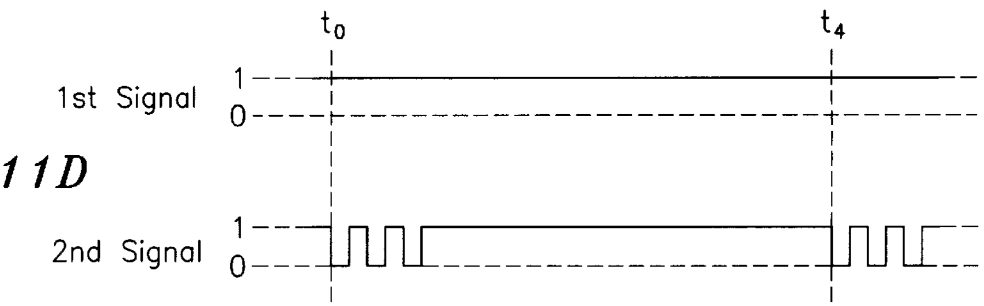

In FIGS. 10G and 10F the resulting first and second signal signatures for a third exemplary embodiment of the plurality of teeth 46 and 48 is illustrated. In the third embodiment, the plurality of teeth 46 and 48 of the click-wheels 42 and 44 are comprised of sixteen teeth. As such, the first and the second electrical signal signatures include 16 pulses during the clockwise and the counterclockwise rotations of the setting stem 20, respectively.

As demonstrated above, the configuration of the teeth directly relates to the signatures of the first and the second electrical signals and, thus, the rate at which values within a setting function are incrementally updated. Importantly, the teeth 46 and 48 of the respective clockwise and counterclockwise click-wheels 42 and 44 are configured to achieve an incremental updating rate, which, according to the present invention, minimizes disturbances in the electrical signals sent to the integrated circuit chip of the timepiece. In other words and as can be appreciated by those skilled in the art, noise or variations within manufacturing tolerances may introduce fluctuations in the signature of the electrical signals sent to the integrated circuit chip. Thus, the number of teeth and their relative location along the outer diameters of the click-wheels are designed to minimize these fluctuations.

For example, the angular relationship between respective teeth ($\theta_1$ and $\theta_2$) are chosen such that the integrated circuit chip of the timepiece 10 is capable of recognizing distinct pulses. That is, in certain embodiments, consecutive teeth or teeth with a relatively small angular separation can generate an electrical signal which rapidly fluctuates between “on” and “off” states. Under some circumstances, the integrated circuit chip may not be able to interpret or distinctly recognize these rapid fluctuations.

Figure 3:
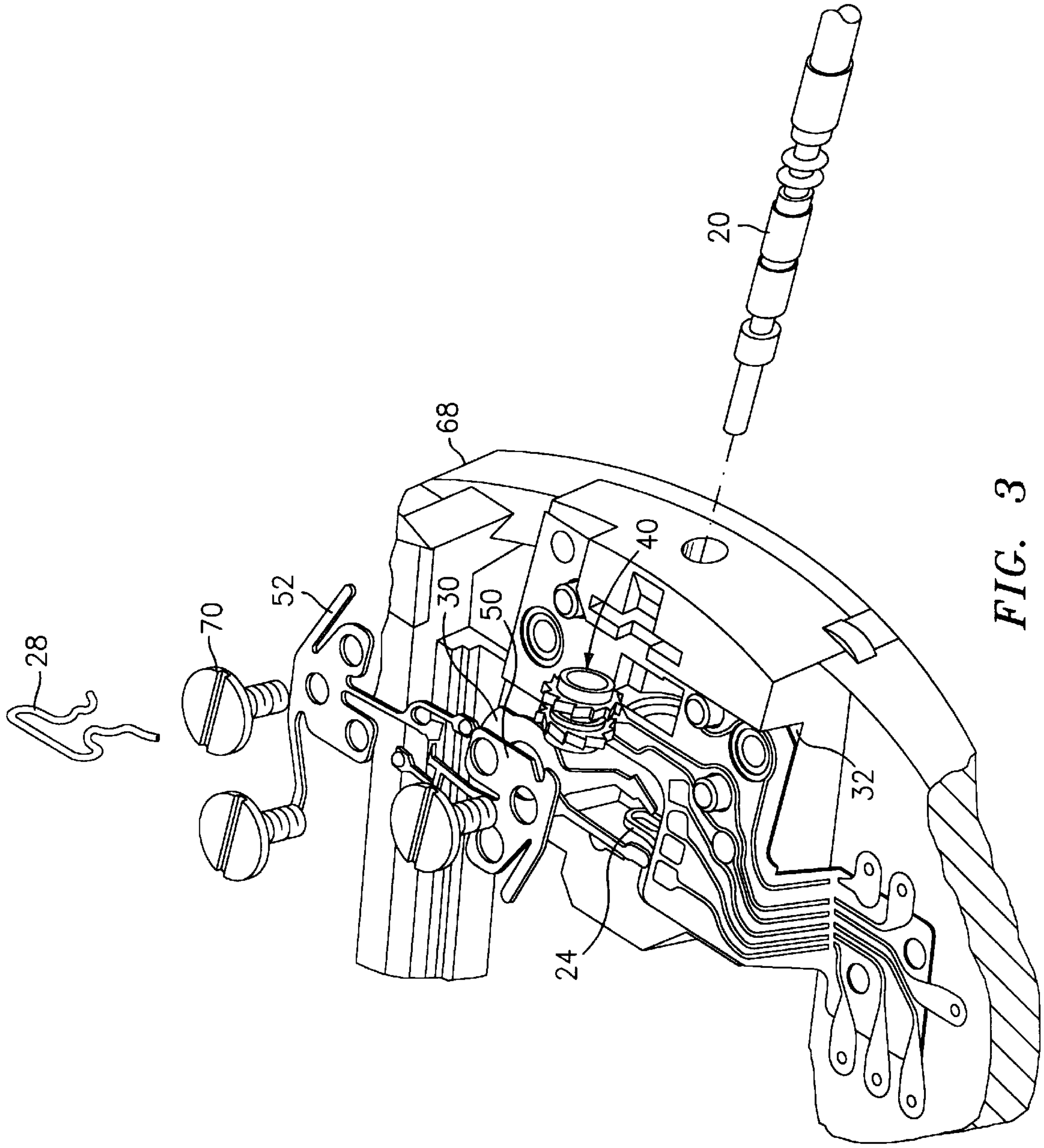
FIG. 3 is an exploded view illustrating a layer construction of the setting mechanism as shown in FIG. 2B.

Referring now to FIG. 3, an exploded prospective view of the above-described components of the setting mechanism 18 is shown. In particular, FIG. 3 shows how these components are assembled in a layered construction and secured in place, for example by screws 70, within a body portion 68 of the timepiece 10.

Figure 4:
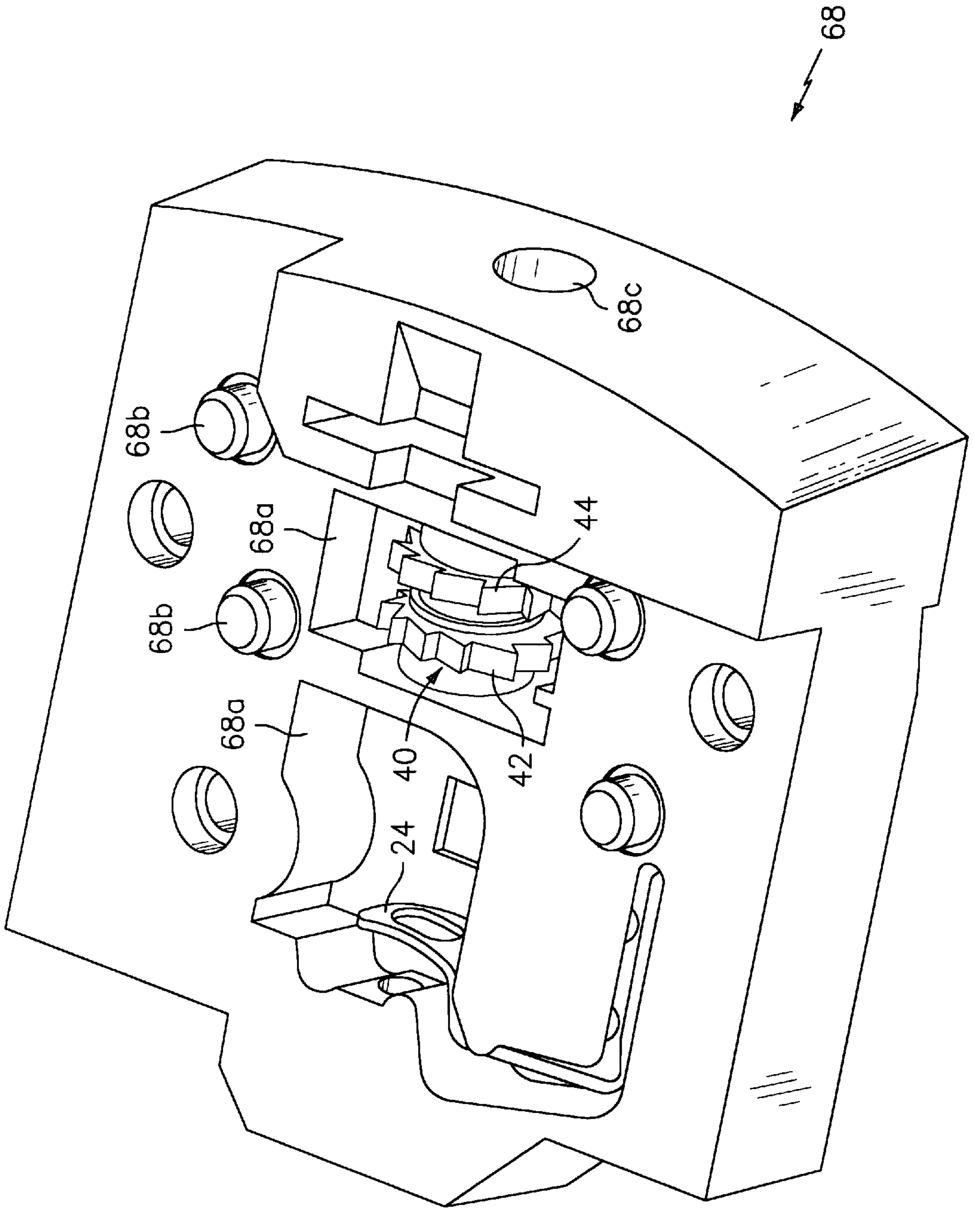
FIG. 4 is a perspective view illustrating a first layer of the setting mechanism with certain components removed for ease of illustration.

In FIG. 4, a preferred embodiment of the body portion 68 is shown. The body portion 68 includes a plurality of cavities 68*a* and forms, or protrusions 68*b*, for retaining the components of the setting mechanism 18. In particular, FIG. 4 illustrates a first layer of the setting mechanism 18 construction which includes the click-wheel assembly 40 and the spring plate 24. Importantly, the click-wheel assembly 40 is aligned such that the assembly 40 is mounted on the setting stem 20 when the setting stem is inserted through a bore 68*c* in the body portion 68 of the watch case 12.

Referring now to FIG. 5, a next layer of the setting mechanism 18 construction is illustrated. The next layer comprises the PCB 32 and the function lever 30. As shown, in the preferred embodiment, the PCB 32 is located about the protrusions 68*b* of the body portion 68, while the function lever 30 is aligned to form an electrical connection with the normal “run” contact terminal 34*a*.

Figure 6:
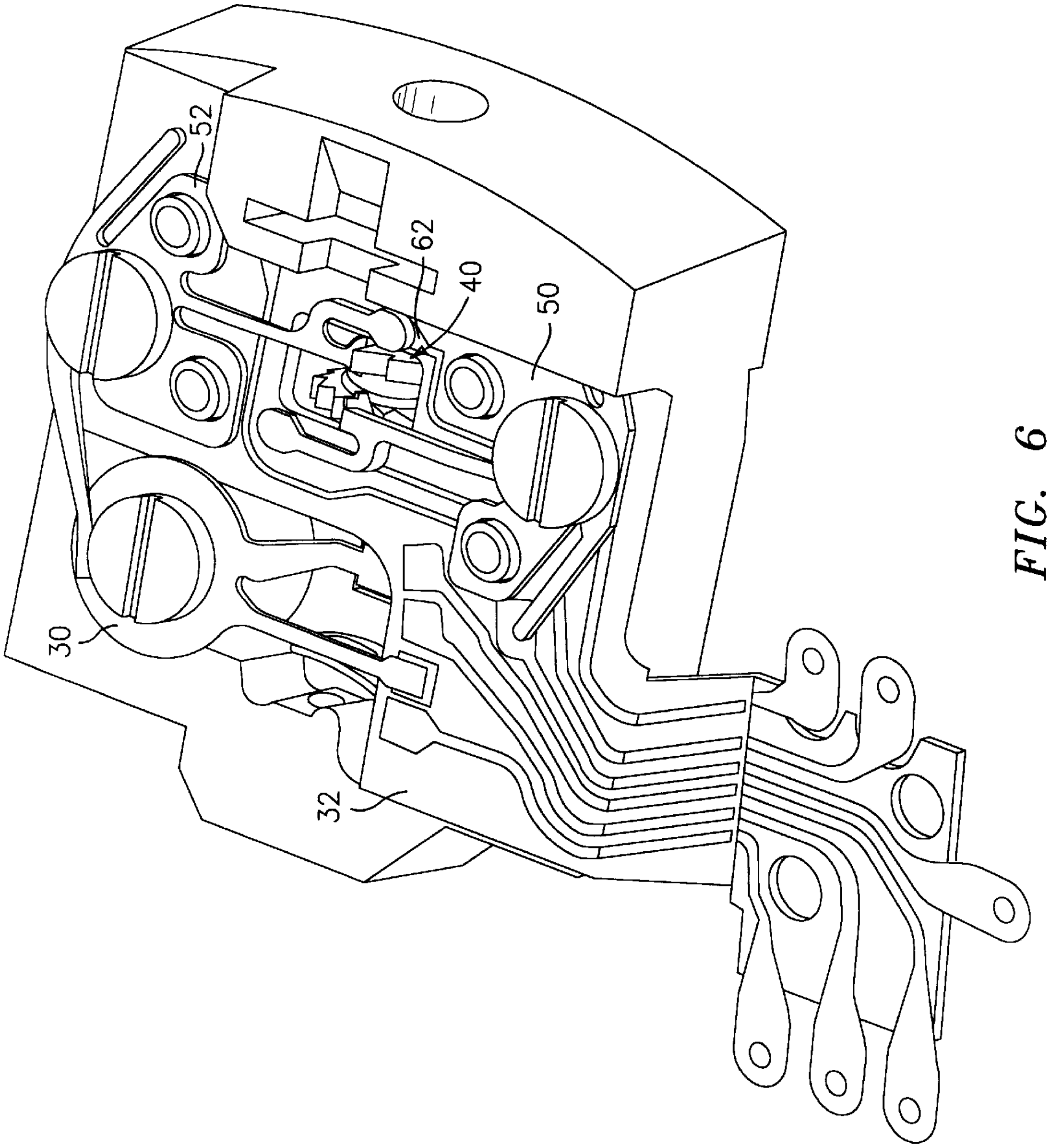
FIG. 6 is a perspective view of the setting mechanism of FIG. 1 illustrating of the setting mechanism with the addition of yet certain other components.

With reference to FIG. 6, a next layer of the setting mechanism 18 construction is illustrated wherein the first and the second holding plates 50 and 52 are included. As can be appreciated, the holding plates 50 and 52 are fastened or otherwise secured in their respective positions to cooperate with the click-wheel assembly 40 as discussed in detail above, and to form respective electrical connections with the contact terminals 60 and 62.

Figure 7:
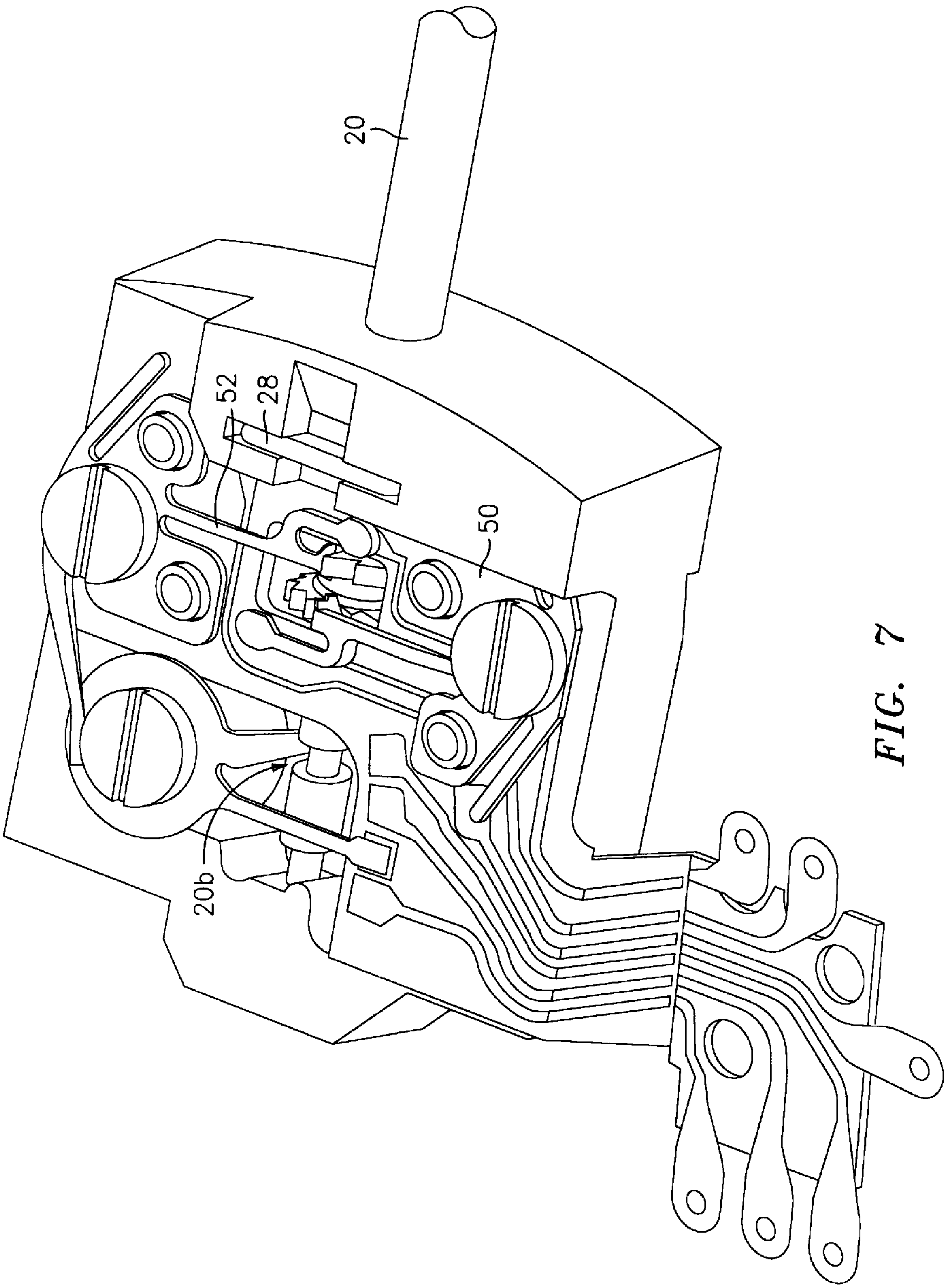
FIG. 7 is a perspective view of the setting mechanism of FIG. 1 which illustrates yet additional components of the setting mechanism.

With reference now to FIG. 7, a final layer of the setting mechanism 18 is illustrated. The final layer includes the setting stem 20 and the retaining spring 28. As is described above, the setting stem 20 is aligned to be coaxial with the click-wheel assembly 40, to accept the spring 28 in one of the detent grooves 26 (not shown) of the first portion 20*a* of the setting stem 20, and to retain the indicating arm 30*a* of the function lever 30 in the second portion 20*b* of the stem 20. As has been described, this configuration of the setting mechanism 18 provides the plurality of axial setting positions and the plurality of rotational setting positions which implement, in accordance with the present invention, the various setting functions of the electronic timepiece 10.

Although described in the context of preferred embodiments, it should be realized that a number of modifications to these teachings may occur to one skilled in the art. By example, and as discussed above, the teachings of this invention are not intended to be limited to any specific number or configuration of teeth of the clockwise and the counterclockwise click-wheels. Rather, the number and configuration of teeth are dictated by a preferred operating frequency or rate at which values within the predetermined setting functions are to be incrementally updated.

While the invention has been particularly shown and described with respect to preferred embodiments thereof, it will be understood by those skilled in the art that changes in form and details may be made therein without departing from the scope and spirit of the invention.

What is claimed is:

1. A setting mechanism for an electronic timepiece having a case and circuitry for performing timepiece functions disposed within a cavity of said case, said setting mechanism comprising:

a setting stem mounted in an opening through said case and operative for axial and rotational movement in relation to said case;

means for retaining said setting stem in said cavity and releasably securing said setting stem in a plurality of axial setting positions in response to said axial movement of said setting stem;

a click-wheel assembly frictionally mounted on said setting stem for selective coaxial rotation therewith, said click-wheel assembly having a first click-wheel and a second click-wheel, each of said click-wheels having a predetermined number of teeth disposed about a respective outer diameter thereof;

a first elongated arm which cooperates with said teeth of said first click-wheel and a first signaling arm for causing incremental electrical pulses when said first elongated arm engages said teeth of said first click-wheel during rotation in a first direction; and a second elongated arm which cooperates with said teeth of said second click-wheel and a second signaling arm for causing incremental electrical pulses when said second elongated arm engages said teeth of said second click-wheel during rotation in a second direction;

wherein said first click-wheel is prevented from rotating relative to said first elongated arm when said setting stem is rotated in said second direction and said second click-wheel is prevented from rotating relative to said second elongated arm when said setting stem is rotated in said first direction;

whereby said first signaling arm only causes incremental electrical pulses when said setting stem is rotated in said first direction and said second signaling arm only causes incremental electrical pulses when said setting stem is rotated in said second direction.

2. The setting mechanism as in claim 1, wherein said incremental electrical pulses of said first electrical signal incrementally increase a value through a series of predefined values during at least one of said predetermined setting functions, and said incremental electrical impulses of said second electrical signal incrementally decrease a value through a series of predefined values during at least one of said predetermined setting functions.

3. The setting mechanism as in claim 1, wherein each tooth of said click-wheels is comprised of a first substantially inclined face and a second substantially vertically aligned face relative to said axis of said setting stem, said inclined face promoting traversal of said tooth by said respective elongated arms, and said vertically aligned face impeding said traversal by said respective elongated arms.

4. The setting mechanism as in claim 1, further comprising:

a spring member for biasing an end of said setting stem disposed in said cavity of said case and facilitating a plurality of axial setting positions in response to said axial movement of said setting stem; and a function lever engagable with said setting stem for providing an indication to said circuitry of a current one of said plurality of axial setting positions.

5. The setting mechanism as in claim 4, wherein said rotational movement of said setting stem in cooperation with said click-wheel assembly, said first elongated arm, and said second elongated arm provides rotational setting positions to corresponding ones of said plurality of axial setting positions.

6. The setting mechanism as in claim 1, wherein said setting stem comprises:

a first portion having a first diameter; and a second portion having a second diameter greater than said first diameter;

wherein said setting stem is in selective coaxial rotational alignment with said first and said second click-wheels when said click-wheels engage said second portion and wherein said setting stem is not in coaxial rotative alignment with said first and said second click-wheels when said click-wheels engage said first portion;

whereby said click-wheels are frictionally engaged with said setting stem and are rotatable in a respective first and second direction when said setting stem is in at least one of said plurality of axial setting positions and frictionally disengaged with said setting stem and do not rotate relative to said respective elongated arms when said setting stem is in another one of said plurality of axial setting positions.

* * * * *